United States Patent
Ashikawa

(10) Patent No.: US 6,923,396 B2
(45) Date of Patent: Aug. 2, 2005

(54) RECORDING TAPE CASSETTE

(75) Inventor: Teruo Ashikawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 47 days.

(21) Appl. No.: 10/420,820

(22) Filed: Apr. 23, 2003

(65) Prior Publication Data

US 2003/0197083 A1 Oct. 23, 2003

(30) Foreign Application Priority Data

Apr. 23, 2002 (JP) ........................................ 2002-120093

(51) Int. Cl.[7] ............................................. G11B 23/04
(52) U.S. Cl. ..................................... 242/346; 360/132
(58) Field of Search .......................... 242/346; 360/132

(56) References Cited

U.S. PATENT DOCUMENTS

| | | | |
|---|---|---|---|
| 3,829,040 A | * | 8/1974 | Nelson .................... 242/346.2 |
| 4,919,356 A | * | 4/1990 | Nakagawa .................. 242/346 |
| 5,416,659 A | | 5/1995 | Saitou et al. |
| 6,405,957 B1 | * | 6/2002 | Alexander et al. .......... 242/346 |
| 6,595,450 B2 | * | 7/2003 | Asano et al. ............ 242/346.2 |

* cited by examiner

*Primary Examiner*—John Q. Nguyen
(74) *Attorney, Agent, or Firm*—Sughrue Mion, PLLC

(57) ABSTRACT

In order to provide a recording tape cassette in which a recording tape can run stably even if a non-recording surface side of the recording tape warps, there is provided a recording tape cassette including a guide shaft, around which the recording tape is wound such that the non-recording surface side thereof contacts the guide shaft, for feeding the recording tape to an outside of the recording tape cassette. outside diameter of the guide shaft becames larger the closer it is to a central portion of the guide shaft in an axial direction.

8 Claims, 4 Drawing Sheets

RECORDING TAPE CASSETTE

BACKGROUND OF THE INVENTION

1. Field of the Invention

The present invention relates to a recording tape cassette, particularly, to a recording tape cassette of which a reel on which a recording tape such as a magnetic tape is wound is accommodated within a case and at which a guide shaft which guides running of the recording tape is provided.

2. Description of the Related Art

Generally, a magnetic tape cassette, in which a magnetic tape as a recording tape is provided, is often used in an audio device, a video device, or the like, as a recording and playback device. For example, in a magnetic tape cassette for business use, used at a broadcasting station or the like, a pair of reels are accommodated in a rotatable manner in a case structured by an upper case and a lower case formed of a synthetic resin, the upper case and the lower case being jointed together. Normally, a magnetic tape is wound on one of the reels, and a tip end of the magnetic tape is attached to the other of the reels. Recording of information onto the magnetic tape or playback of the information recorded on the magnetic tape is carried out by that the magnetic tape is fed from the one of the reels to the other of the reels.

The each reel on which the magnetic tape is wound is structured by a lower flange, a hub and an upper flange. The hub is fixed to an upper side of the lower flange integrally. The upper flange is attached on an upper side of the hub. The tip end of the magnetic tape is attached to the hub, and the magnetic tape is wound on a peripheral surface of the hub.

The magnetic tape is exposed at a central portion of a front wall of the case such that the magnetic tape can slide in contact on a head for recording and playback of the recording and playback device. The front wall of the case is covered (closed) by a cover when the magnetic tape cassette is not in use (when the magnetic tape cassette is not loaded on the recording and playback device). The cover is structured such that the cover can move to rotate upwardly. As the result, the cover is withdrawn to an upper portion of the case (the cover is moved to position at the upper portion of the case) thereby the magnetic tape is exposed when the magnetic tape cassette is in use (when the magnetic tape cassette is loaded on the recording and playback device).

Further, a pin is provided to stand erect (stand vertically) at an inner surface of a front portion of the lower case. The pin is inserted into a lower end of the guide shaft made of metal and having a cylinder configuration. A protrusion provided on the upper case is inserted into an upper end of the guide shaft. Accordingly, the guide shaft is held vertically and in non-rotating state with respect to the upper case and the lower case. The magnetic tape is fed outside the case such that a back surface of the magnetic tape, as a non recording surface, is wound around the guide shaft (the magnetic tape is wound around the guide shaft such that back surface of the magnetic tape contacts the guide shaft) and the magnetic tape is guide.

However, a backside of the magnetic tape, as a non-recording surface side, is generally coated by a material which is different from a material of a front side of the magnetic tape. In this case, the magnetic tape runs in a state in which the magnetic tape is warped (the magnetic tape is curved such that the backside of the magnetic tape becomes an inner side of the curved tape) as shown in FIG. 4 due to difference of percentages of contraction (coefficients of contraction) between the backside and the front side of the magnetic tape. Accordingly, in a case in which the guide shaft has a cylinder configuration, two points (opposite edges) of the magnetic tape T contact the guide shaft 50, as shown in FIG. 4, namely, the magnetic tape T does not contact the guide shaft 50 with an entire surface of the magnetic tape T. Therefore, there is a case in which the magnetic tape T falls downward (slips downward) along the guide shaft 50 during running.

If the magnetic tape runs in the state in which the magnetic tape T falls downward along the guide shaft 50 as described above, a lower end (edge) of the magnetic tape T rubs against an inner surface or the like of the lower case 52. Therefore, the edge of the magnetic tape T suffers damage. Even if a flange or the like (not shown in the drawings) is provided at a peripheral surface of the guide shaft 50 in order to prevent the magnetic tape T from falling downward, the lower end (edge) of the magnetic tape T rubs against the flange or the like, therefore, the edge of the magnetic tape T is damaged.

SUMMARY OF THE INVENTION

In view of the aforementioned, an object of the present invention is to provide a recording tape cassette in which, even if a recording tape runs in a state in which the recording tape is warped, the recording tape can run stably.

A first aspect of the invention is a recording tape cassette comprising a guide shaft around which a non-recording surface of a recording tape is wound and which guides running of the recording tape, wherein the guide shaft is formed such that the closer a central portion of the guide shaft in an axis direction of the guide shaft is, the larger an outside diameter of the guide shaft becomes (an outside diameter of the guide shaft becomes larger approaching a central portion of the guide shaft in an axis direction of the guide shaft).

In a second aspect of the invention according to the first aspect, the recording tape is fed to an exterior of a case of the recording tape cassette by the guide shaft.

In a third aspect of the invention according to the second aspect, the guide shaft is provided at an end portion of the case in a direction in which the recording tape cassette is loaded to a recording and playback device.

In a fourth aspect of the invention according to the third aspect, a plurality of the guide shafts are provided at the end portion of the case.

In a fifth aspect of the invention according to the first aspect, a case of the recording tape cassette is structured by an upper case and a lower case, the guide shaft being held vertically in a non-rotating state with respect to the upper case and the lower case.

In a sixth aspect of the invention according to the fifth aspect, an upper protrusion provided at an inner surface of the upper case and a lower protrusion provided at an inner surface of the lower case are inserted into an upper end of the guide shaft and a lower end of the guide shaft respectively.

In a seventh aspect of the invention according to the first aspect, a peripheral surface of the guide shaft is formed such that the non-recording surface of the recording tape in a warped state surface-contacts the peripheral surface of the guide shaft.

An eighth aspect of the invention is a recording tape cassette comprising a guide shaft for guiding running of a recording tape, around which a non-recording surface of the recording tape is wound, and which feeds the recording tape to an exterior of a case of the recording tape cassette, wherein the guide shaft is formed, so as to surface-contact the recording tape in a warped state, such that the closer a central portion of the guide shaft in an axis direction of the guide shaft is, the larger an outside diameter of the guide shaft becomes.

In accordance with the aspects of the invention, because the guide shaft is formed to have so-called a potbelly-shape so as to correspond to the shape of the warped recording tape, namely, the guide shaft is formed such that the closer the central portion of the guide shaft in the axis direction of the guide shaft is, the gradually larger the outside diameter of the guide shaft becomes, even if the recording tape runs in a state in which the recording tape is warped due to shrinkage of the non-recording surface of the recording tape, the recording tape is guided in a state in which the non-recording surface of the recording tape surface-contacts the guide shaft. Therefore, the recording tape can run stably.

DESCRIPTION OF THE PREFERRED EMBODIMENT

An embodiment of the present invention will be given hereinafter in detail on the basis of an example shown in drawings. Note that, for convenience of explanation, a direction of loading a recording tape cassette into a recording and playback device (an audio device, a video device, or the like) is called a front direction (FR), and a rear (RE), left (LE), right (RI), top (UP), and bottom (LO) directions are expressed on the basis of the front direction. Further, a magnetic tape is adopted as a recording tape, and a magnetic tape cassette 10 will be explained hereinafter.

Figure 1:
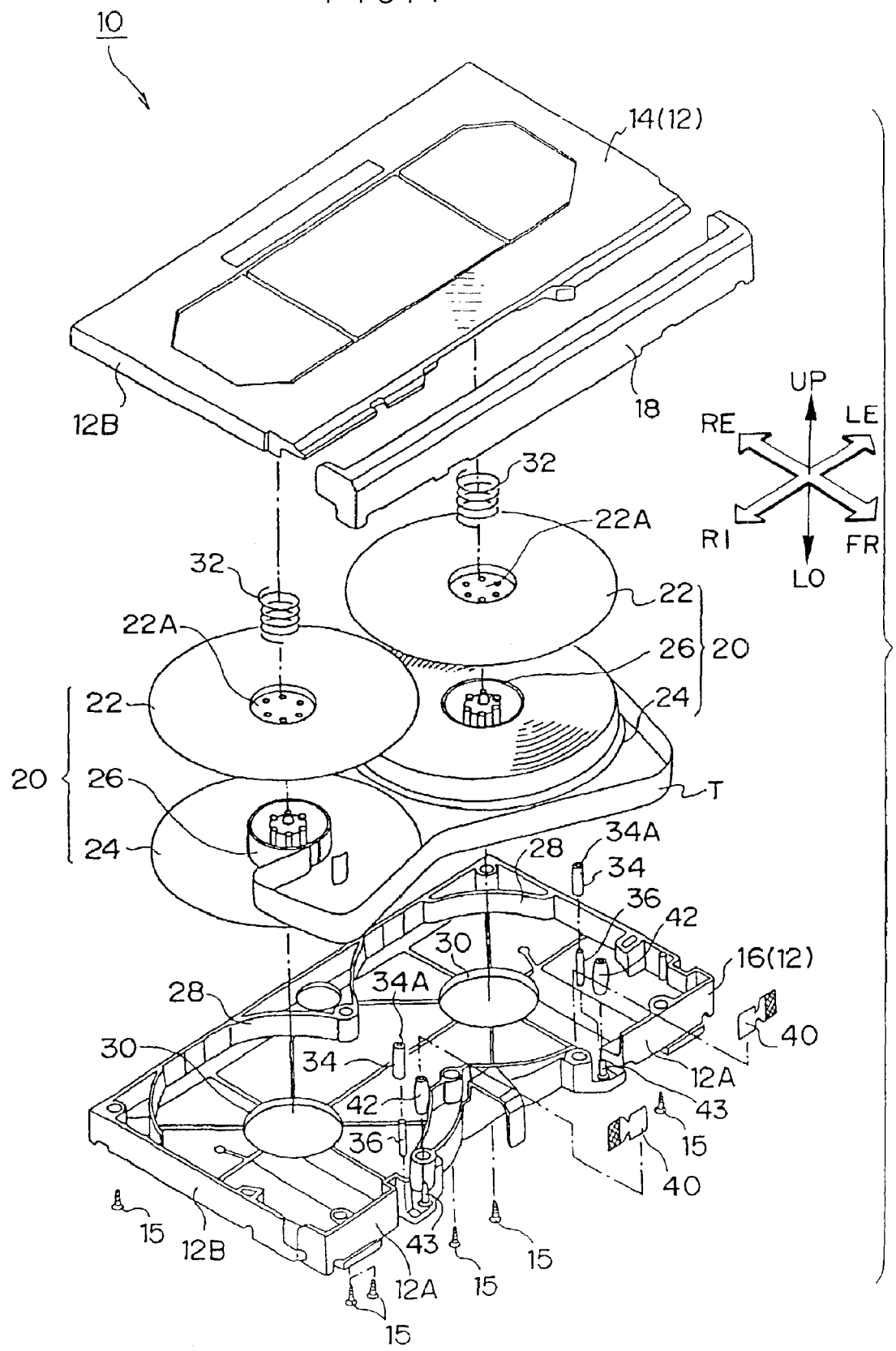
FIG. 1 is an exploded schematic perspective view showing a magnetic tape cassette relating to the present invention seen from oblique above.

As shown in FIG. 1, a magnetic tape cassette 10 (for example, a beta cam L cassette), used at a broadcasting station or the like for business use, is provided with a case 12 having a substantially rectangular box configuration in which dimension in a right and left direction is longer than that of a front and rear direction. The case 12 is structured by an upper case 14 and a lower case 16. The upper case 14 and the lower case 16 are jointed together by a plurality of attaching screws 15 being screwed from a lower surface of the lower case 16. At a front wall 12A of the case 12, a cover 18 which covers the front wall 12A is provided.

The cover 18 is supported such that opposite ends of (an axis of) the cover 18 are supported at front ends of side walls 12B of the case 12 and the cover 18 can circularly move upwardly. The magnetic tape T exposed at a central portion of the front wall 12A of the case 12 is covered by the cover 18. Namely, the cover 18 is positioned at a front side with respect to the front wall 12A of the case 12 so as to cover the magnetic tape T when the magnetic tape cassette is not loaded on the recording and playback device. The cover 18 moves to rotate upwardly and is withdrawn to an upper side of the case 12 (is positioned at the upper side of the case 12) when the magnetic tape cassette is loaded on the recording and playback device such that the magnetic tape T exposed at the central portion of the front wall 12A of the case 12 can slide in contact on a head for recording and playback of the recording and playback device.

A pair of substantially cylinder (tube) shaped walls 28 for preventing reel from moving freely are provided to stand erect at an inner surface of the lower case 16. A pair of reels 20 are rotatably accommodated within the respective walls 28 for preventing reel from moving freely. Each reel 20 is structured by a lower flange 24, a hub 26 and an upper flange 22. The hub 26 is fixed to an upper side of the lower flange 24 integrally. The upper flange 22 is attached on an upper side of the hub 26. Generally, one end of the magnetic tape T is attached to the hub 26 of one of the reels 20 and the magnetic tape T is wound on the one of the reels 20, and another end of the magnetic tape T is attached to the hub 26 of the other of the reels 20, when the magnetic tape cassette 10 is not in use.

A concave portion 22A is formed at a central portion of an upper surface of the upper flange 22. A compression coil spring 32 is provided in the concave portion 22A. A lower end of the compression coil spring 32 is supported at a bottom surface of the concave portion 22A, and an upper end of the compression coil spring 32 is supported at an inner surface of the upper case 14. As the result, the each compression coil spring 32 urges each reel 20 downwardly (toward the lower case 16 side). A pair of openings 30, at which each reel rotating gear (not shown in the drawings) provided at respective lower surfaces of the reels 20 appear, are formed (drilled) at the lower case 16.

Figure 2:
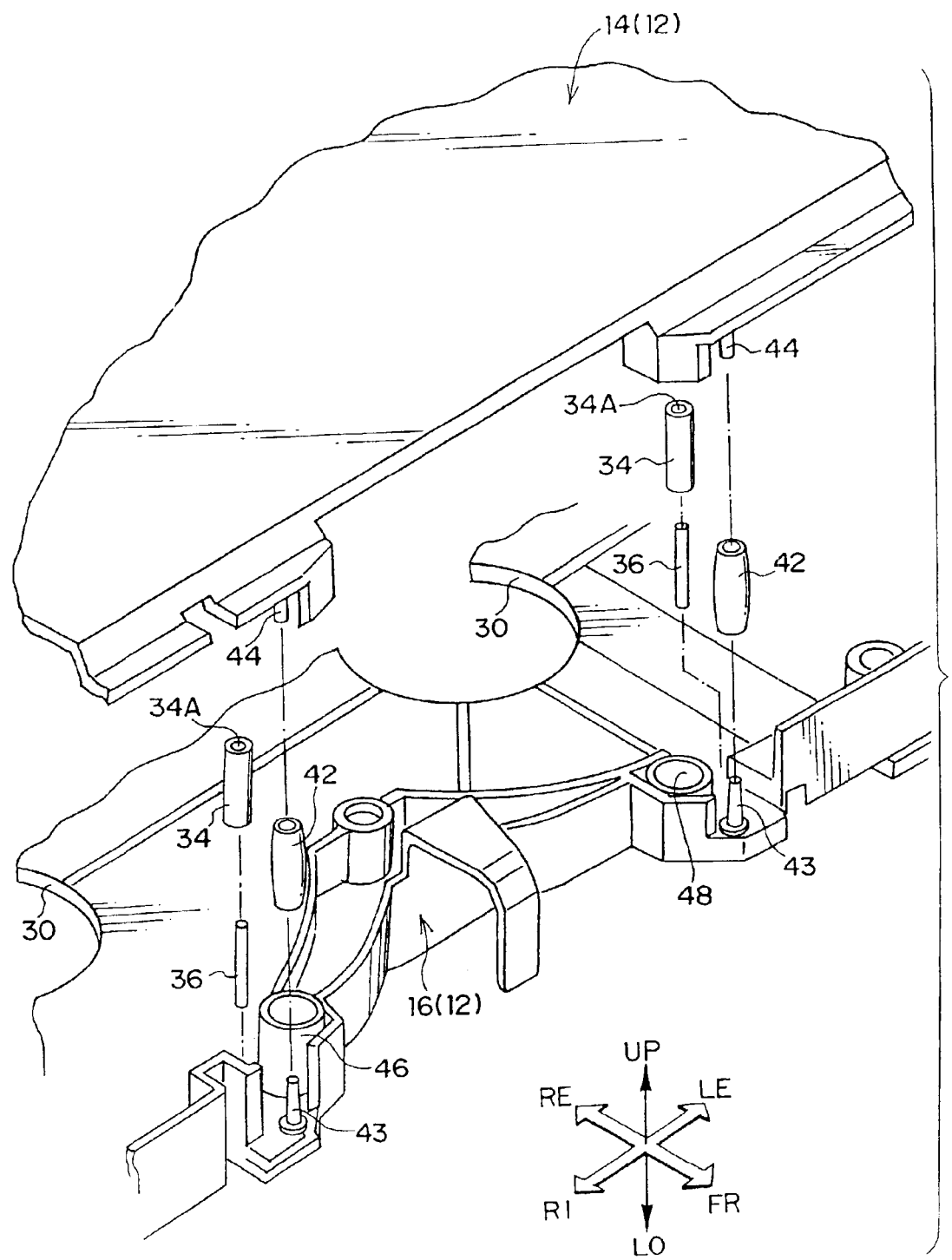
FIG. 2 is an exploded schematic perspective view showing a main portion of a front wall side of the magnetic tape cassette relating to the present invention seen from oblique above.

Further, at the front portion of the lower surface of the lower case 16, reference holes for positioning the magnetic tape cassette with respect to the recording and playback device are provided. As shown in FIG. 2, the reference holes are formed in bag portions 46 and 48, which protrude toward inside of the case 12. The reference hole formed in one of the bag portions (for example, the bag portion 46 located at the right side) has a circular shape in a plane view. The reference hole formed in other of the bag portions (for example, the bag portion 48 located at the left side) has substantially ellipse shape, whose dimension in the left and right direction is longer than that in the front and rear direction, in a plane view. When the magnetic tape cassette 10 is loaded into the recording and playback device, members for positioning (not shown in the drawings) such as pins or the like are inserted into respective reference holes, and a position of the magnetic tape cassette 10 with respect to the recording and playback device in the front, rear, right and left directions is regulated (determined).

Bosses (not shown in the drawings), having cylinder configuration and having predetermined height, are provided in protruding manner at positions, which positions are at the inner surface of the front portion of the lower case 16 and are positioned outwardly with respect to the respective reference holes (the bag portions 46 and 48). Holding holes (not shown in the drawings) having substantially square shape in a plane view are formed (drilled) within the respective bosses. A pair of shafts 36, made of metal, having longitudinal cylinder configuration, are inserted into the respective holding holes. Each shaft 36 stands erect (vertically) with respect to the lower case 16. The shafts 36 are inserted into guide rollers 34, made from a synthetic resin, such that there is play therebetween. A passing through hole 34A having circular shape in a plane view is formed in each guide roller 34 along central axis of the guide roller 34

Bosses (not shown in the drawings), having cylinder configuration and having predetermined height, are also provided in protruding manner at positions, which positions are at the inner surface of the front portion of the upper case 14. Holding holes (not shown in the drawings) having substantially circular shape in a plane view are formed (drilled) within the respective bosses. Upper ends of the shafts 36 are inserted into the respective holding holes. Therefore, each guide roller 34 is supported in rotatable manner by respective shafts 36 as axes thereof, and is held in vertical state with respect to the upper case 14 and the lower case 16. The magnetic tape T runs stably from the one of the reels 20 to the other of the reels 20 (feeding out and rewinding of the magnetic tape T are carried out) while the magnetic tape T is guided by the guide rollers 34. Therefore, it is preferable that the guide roller 34 is formed (molded) from synthetic resin which has slipping characteristics and whose mechanical strength is relatively large, such as POM resin or the like.

Tape pads 40 are provided in the vicinity of the respective guide rollers 34. The tape pad 40 contacts the backside of the magnetic tape T and presses the magnetic tape T from the backside of the magnetic tape T so as to prevent the magnetic tape T from sagging. The magnetic tape T runs while being pressed by the tape pads 40 with appropriate urging forces. Accordingly, magnetic tape-jamming or the magnetic tape T being scratched can be prevented.

Pins 43 having a predetermined height are provided at the inner surface of the lower case 16 to stand erect. Each pin 43 is provided at the front side with respect to the tape pad 40 and between the guide roller 34 and the reference hole (bag portion 46 or 48). The pins 43 are inserted into lower ends of respective guide shafts 42, which are made of metal and have cylinder (tube) configuration, Protrusion 44, having cylinder configuration, provided at the inner surface of the upper case 14 are inserted into upper ends of the guide shafts 42. Therefore, each guide shaft 42 is held (fixed) vertically with respect to the upper case 14 and the lower case 16 in non-rotating state. The backside of the magnetic tape T, which is a non-recording surface side of the magnetic tape T, is wound substantially half around the guide shaft 42 with a predetermined tension (the magnetic tape T is wound around a substantially half-peripheral surface of the guide shaft such that the back side of the magnetic tape T contacts guide shaft 42). The guide shafts 42 and the guide rollers 34 guide the magnetic tape T.

Figure 3:
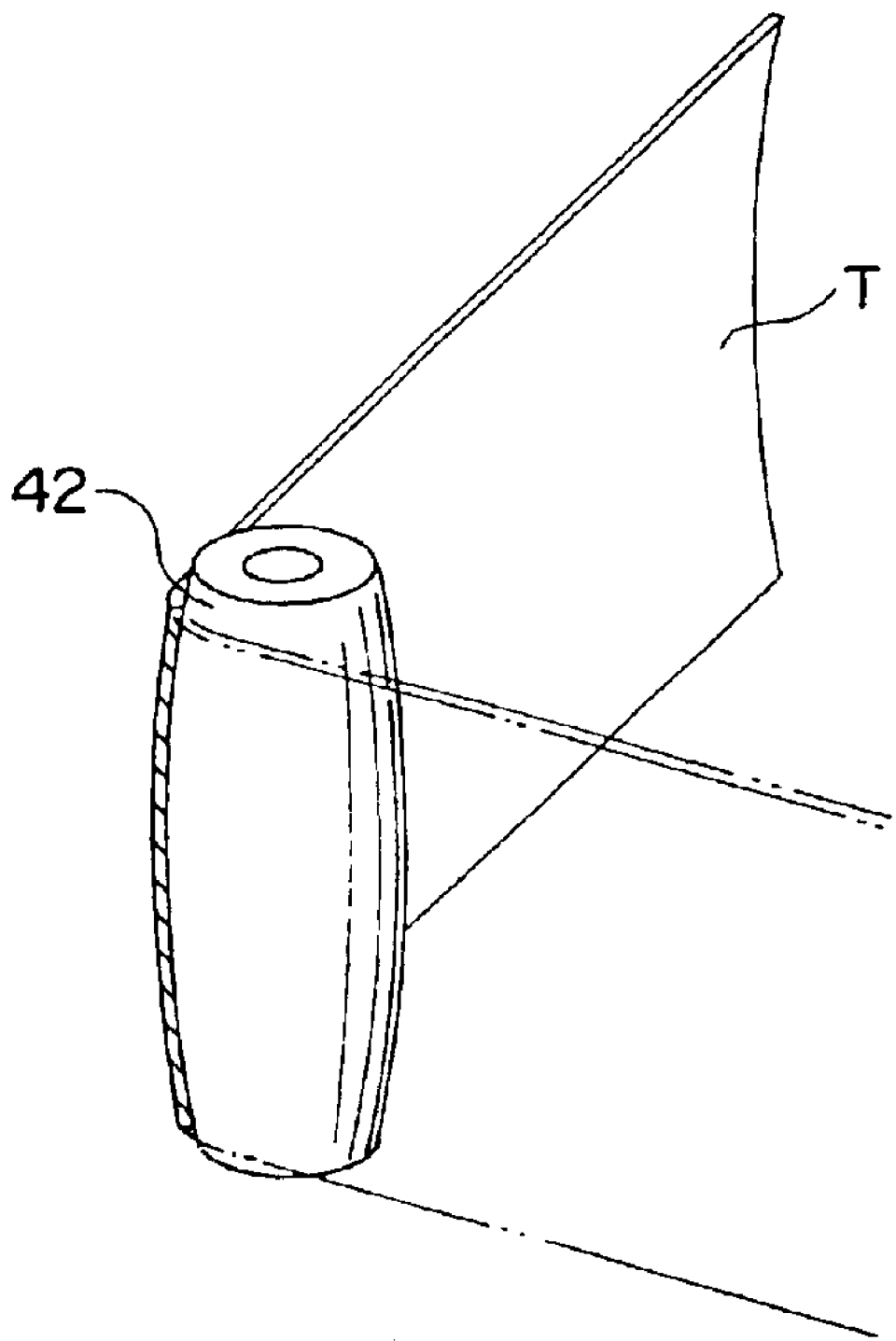
FIG. 3 is a schematic perspective view showing a guide shaft and the magnetic tape is wound around the guide shaft relating to the present invention.
Figure 4:
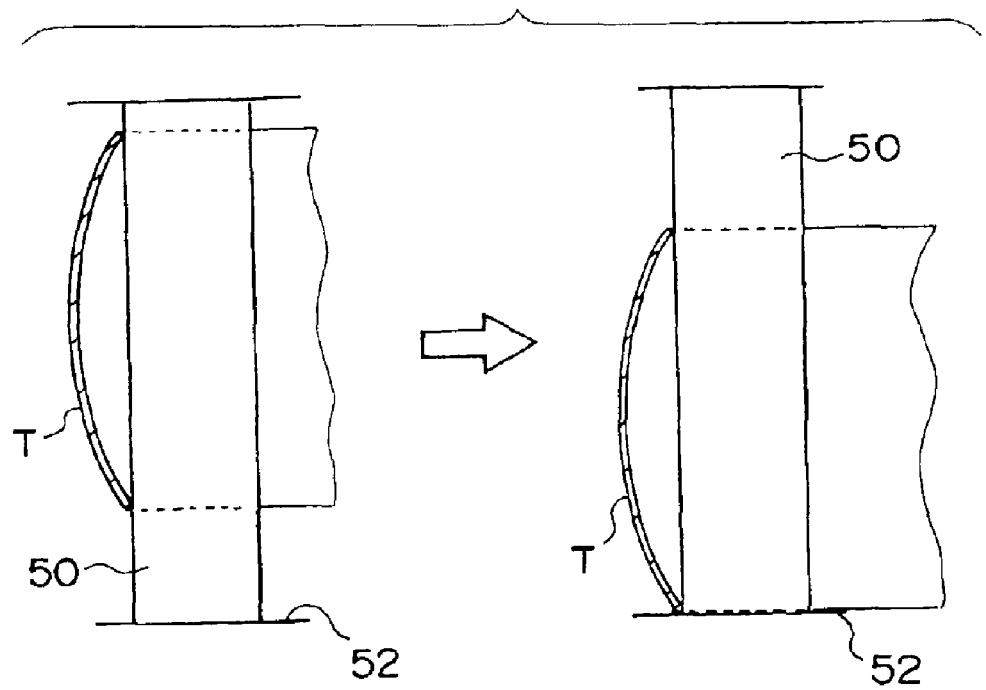
FIG. 4 is a schematic perspective view showing a guide shaft and a magnetic tape is wound around the guide shaft relating to the prior art.

The backside of the magnetic tape T, which is the non-recording surface side, is generally coated by a material which is different from a material of a front side of the magnetic tape T. Accordingly, the magnetic tape T runs in a state in which an upper end (edge) portion and a lower end (edge) portion of the magnetic tape T are warped (curved) slightly toward the back side because the backside of the magnetic tape T shrinks due to difference of percentages of contraction (coefficients of contraction) between the backside and the front side. Namely, the magnetic tape T is curved such that the backside of the magnetic tape becomes an inner side of the curved tape. Accordingly, as shown in FIG. 3, the guide shaft 42 is formed such that the closer a central portion of the guide shaft 42 in an axis direction of the guide shaft 42 is, the gradually larger an outside diameter of the guide shaft 42 becomes. (In other words, the closer opposite ends of the guide shaft 42 in the axis direction is, the gradually smaller the outside diameter of the guide shaft 42 becomes.) Namely, the guide shaft 42 has so-called a potbelly-shape (the guide shaft 42 slightly swells at the central portion thereof).

Due to the guide shaft 42 being formed in the configuration described above, shape of the magnetic tape T which is warped agrees with the peripheral surface of the guide shaft 42. Accordingly, the magnetic tape T can be guided by the guide shaft 42 in a state in which the magnetic tape T surface-contacts the peripheral surface of the guide shaft 42. Therefore, it can be prevented that the magnetic tape T falls downward (slips downward) along the guide shaft during running and the magnetic tape T is damaged. Accordingly, the magnetic tape T can be guided by the guide shafts 42 preferably and efficiently, and can run stably.

Next, an operation of the magnetic tape cassette 10 described above will be described.

The magnetic tape T is stored such that the front wall 12A of the case 12 is covered (closed) by the cover 18, and the magnetic tape T is wound on the one of the reels 20 and the tip end of the magnetic tape T is attached to the other of the reels 20, when the magnetic tape cassette 10 is not in use (when the magnetic tape cassette 10 is not loaded on the recording and playback device).

When the magnetic tape cassette 10 is in use, the magnetic tape cassette 10 is loaded on the recording and playback device. When the magnetic tape cassette 10 is loaded on the recording and playback device, the cover 10 moves to rotate upwardly and is withdrawn to the upper portion of the case, and the magnetic tape T is exposed. Then, the reel rotating gear meshes with the driving gear (not shown in the drawings) to rotate the reel 20. As the result, the magnetic tape T is fed from the one of the reels 20 to the other of the reels 20.

At this time, due to that the backside of the magnetic tape T is coated by the material which is different from the material of the front side of the magnetic tape T, the magnetic tape T runs in the state in which the magnetic tape T is warped slightly as described above. However, because the guide shaft 42, on which the back side of the magnetic tape T contacts (around which the magnetic tape T is wound), is formed to have so-called a potbelly-shape, the magnetic tape T is guided by the guide shaft 42 in the state in which the magnetic tape T is kept on (in a surface-contact state) the peripheral surface of the guide shaft 42. Therefore, it can be prevented that the magnetic tape T falls downward along the guide shaft 42 and the edge of the magnetic tape T is damaged. Accordingly, it is realized that the magnetic tape T is guided by the guide shafts 42 preferably and efficiently, and runs stably.

In this way, while the magnetic tape T runs from the one of the reels 20 to the other of the reels 20. Recording of information onto the magnetic tape T or playback of the information recorded on the magnetic tape T is carried out by that the exposed magnetic tape T, which is fed from the central portion of the front wall 12A of the case 12 by the guide shafts 42, slides in contact on the recording and playback head. It is also realized that the magnetic tape T runs stable by the guide shafts 42 in the similar way in a case in which the magnetic tape T is re-wound when the magnetic tape cassette 10 is ejected from the recording and playback device.

As described above, in the present invention, because the guide shaft is formed to have so-called a potbelly-shape, namely, the guide shaft is formed such that the closer the central portion of the guide shaft in the axis direction of the guide shaft is, the gradually larger the outside diameter of the guide shaft becomes, the warped recording tape can be preferably guided in a state in which the recording tape surface-contacts the guide shaft. Therefore, the recording tape can run stably.

What is claimed is:

1. A recording tape cassette comprising:
   a guide shaft around which a non-recording surface of a recording tape is wound and which guides running of the recording tape, wherein the guide shaft is formed such that the outside diameter of the guide shaft becomes larger the closer it is to a central portion of the guide shaft in an axial direction; and
   a case, the case comprising an upper case and a lower case;
   wherein the guide shaft is held vertically in a non-rotating state with respect to the upper case and the lower case; and
   wherein the guide shaft directs the recording tape to an exterior of the case.

2. A recording tape cassette according to claim 1, wherein the guide shaft is formed such that a circumferential surface of the guide shaft corresponds to the recording tape in a warped state caused by the non-recording surface being shrunk due to difference of coefficients of contraction between the non-recording surface and a recording surface.

3. A recording tape cassette according to claim 1, wherein the guide shaft is provided at a front end portion of the case, where the front is defined as the direction in which the recording tape cassette is loaded into a recording and playback device.

4. A recording tape cassette according to claim 3, wherein a plurality of the guide shafts are provided at the end Of the case.

5. A recording tape cassette according to claim 1, wherein a peripheral surface of the guide shaft is formed such that the non-recording surface of the recording tape in a warped state surface-contacts the peripheral surface of the guide shaft.

6. A recording tape cassette according to claim 1, wherein an upper protrusion, provided at an inner surface of the upper case and a lower protrusion, provided at an inner surface of the lower case, are fitted by insertion into an upper end of the guide shaft and a lower end of the guide shaft, respectively.

7. A recording tape cassette comprising:
   a case comprising an upper case and a lower case;
   a guide shaft made of metal around which a non-recording surface of a recording tape is wound and which guides running of the recording tape, the guide shaft being held vertically in a non-rotating state with respect to the upper case and the lower case, and directing the recording tape to an exterior of the case; and
   a guide roller made of resin around which the recording tape is wound and which guides running of the recording tape in the case, the guide roller being held vertically in rotating state with respect to the upper case and the lower case, positioned at a rear side in a direction of loading of the recording tape cassette with respect to the guide shaft,
   wherein the guide shaft is formed such that the outside diameter of the guide shaft becomes larger the closer it is to a central portion of the guide shaft in an axial direction.

8. A recording tape cassette comprising:
   a guide shaft for guiding running of a recording tape, around which a non-recording surface of the recording tape is wound, and which directs the recording tape to an exterior of a case of the recording tape cassette; and
   a case, the case comprising an upper case and a lower case;
   wherein the guide shaft is held vertically in a non-rotating state with respect to the upper case and the lower case and is formed, such that the outside diameter of the guide shaft becomes larger the closer it is to a central portion of the guide shaft in an axial direction and such that the guide shaft contacts the non-recording surface of the recording tape in a warped stated; and
   wherein the guide shaft directs the recording tape to an exterior of the case.

* * * * *